United States Patent
Kaufman et al.

(10) Patent No.: US 10,691,524 B2
(45) Date of Patent: Jun. 23, 2020

(54) DIAGNOSTIC SYSTEM AND METHOD

(71) Applicant: Bugreplay Inc., New Rochelle, NY (US)

(72) Inventors: Samuel Kaufman, New Rochelle, NY (US); Joanna Kaufman, New Rochelle, NY (US); Joseph Papperello, Brooklyn, NY (US)

(73) Assignee: Bugreplay Inc., New Rochelle, NY (US)

( * ) Notice: Subject to any disclaimer, the term of this patent is extended or adjusted under 35 U.S.C. 154(b) by 154 days.

(21) Appl. No.: 15/663,100

(22) Filed: Jul. 28, 2017

(65) Prior Publication Data

US 2018/0032389 A1 Feb. 1, 2018

Related U.S. Application Data

(60) Provisional application No. 62/367,704, filed on Jul. 28, 2016.

(51) Int. Cl.
| | |
|---|---|
| *G06F 15/177* | (2006.01) |
| *G06F 9/00* | (2006.01) |
| *G06F 11/07* | (2006.01) |
| *G06F 11/22* | (2006.01) |
| *G06F 11/14* | (2006.01) |
| *G05B 23/02* | (2006.01) |
| *G06F 11/32* | (2006.01) |

(52) U.S. Cl.
CPC ........ *G06F 11/079* (2013.01); *G06F 11/0712* (2013.01); *G06F 11/0748* (2013.01); *G06F 11/0766* (2013.01); *G06F 11/1482* (2013.01); *G06F 11/2294* (2013.01); *G05B 23/0278* (2013.01); *G06F 11/32* (2013.01)

(58) Field of Classification Search
CPC .............. G06F 11/079; G06F 11/0766; G06F 11/0748; G06F 11/0712; G06F 11/1482; G06F 11/2294; G06F 11/32; G05B 23/0278

See application file for complete search history.

(56) References Cited

U.S. PATENT DOCUMENTS

| | | | | |
|---|---|---|---|---|
| 10,146,609 | B1* | 12/2018 | Leverich | G06F 11/0721 |
| 2013/0159507 | A1* | 6/2013 | Mason | G06Q 30/02 709/224 |
| 2013/0198376 | A1* | 8/2013 | Landa | G06Q 10/04 709/224 |
| 2014/0331136 | A1* | 11/2014 | Desmons | G06F 16/9537 715/719 |
| 2016/0019597 | A1* | 1/2016 | Smith | G06Q 30/0275 705/14.71 |
| 2017/0063653 | A1* | 3/2017 | Kieviet | G06Q 10/06 |

* cited by examiner

*Primary Examiner* — Xuxing Chen
(74) *Attorney, Agent, or Firm* — Brian J. Colandreo; Heath M. Sargeant; Holland & Knight LLP

(57) ABSTRACT

A computer-implemented method, computer program product and computing system for recording video information on the computing device during a monitored event. Execution information is recorded on the computing device during the monitored event. The video information and the execution information are temporally synchronized to form temporally-synchronized diagnostic content.

18 Claims, 2 Drawing Sheets

DIAGNOSTIC SYSTEM AND METHOD

RELATED APPLICATION

This application claims the benefit of U.S. Provisional Application No. 62/367,704, filed on 28 Jul. 2016, the contents of which are incorporated herein by reference.

TECHNICAL FIELD

This disclosure relates to diagnostic systems and, more particularly, to diagnostic systems for use with computing systems.

BACKGROUND

During the normal operation of computing devices, problems may be encountered. For example, web applications may not operate properly, resulting in websites not loading properly. Unfortunately, diagnosing and reporting these issues is often highly frustrating, as the user who experienced the issue would need to describe the issue that they experienced to a remote technician so that the technician may attempt to diagnose the problem remotely. Alternatively and in order to avoid such a situation, the user may have a technician make a "house call" to locally resolve the problem, but that typically incurs considerable expense.

SUMMARY OF DISCLOSURE

In one implementation, a computer-implemented method is executed on a computing device and includes recording video information on the computing device during a monitored event. Execution information is recorded on the computing device during the monitored event. The video information and the execution information are temporally synchronized to form temporally-synchronized diagnostic content.

One or more of the following features may be included. The temporally-synchronized diagnostic content may be provided to a third party for analysis. Recording video information on the computing device during a monitored event may include recording a timestamped video portion. The execution information may include network traffic information. The execution information may include diagnostic information. The video information may include web browser content rendered within a web browser by the computing device. The monitored event may be a computer malfunction event.

In another implementation, a computer program product resides on a computer readable medium and has a plurality of instructions stored on it. When executed by a processor, the instructions cause the processor to perform operations including recording video information on the computing device during a monitored event. Execution information is recorded on the computing device during the monitored event. The video information and the execution information are temporally synchronized to form temporally-synchronized diagnostic content.

One or more of the following features may be included. The temporally-synchronized diagnostic content may be provided to a third party for analysis. Recording video information on the computing device during a monitored event may include recording a timestamped video portion. The execution information may include network traffic information. The execution information may include diagnostic information. The video information may include web browser content rendered within a web browser by the computing device. The monitored event may be a computer malfunction event.

In another implementation, a computing system includes a processor and a memory system configured to perform operations including recording video information on the computing device during a monitored event. Execution information is recorded on the computing device during the monitored event. The video information and the execution information are temporally synchronized to form temporally-synchronized diagnostic content.

One or more of the following features may be included. The temporally-synchronized diagnostic content may be provided to a third party for analysis. Recording video information on the computing device during a monitored event may include recording a timestamped video portion. The execution information may include network traffic information. The execution information may include diagnostic information. The video information may include web browser content rendered within a web browser by the computing device. The monitored event may be a computer malfunction event.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
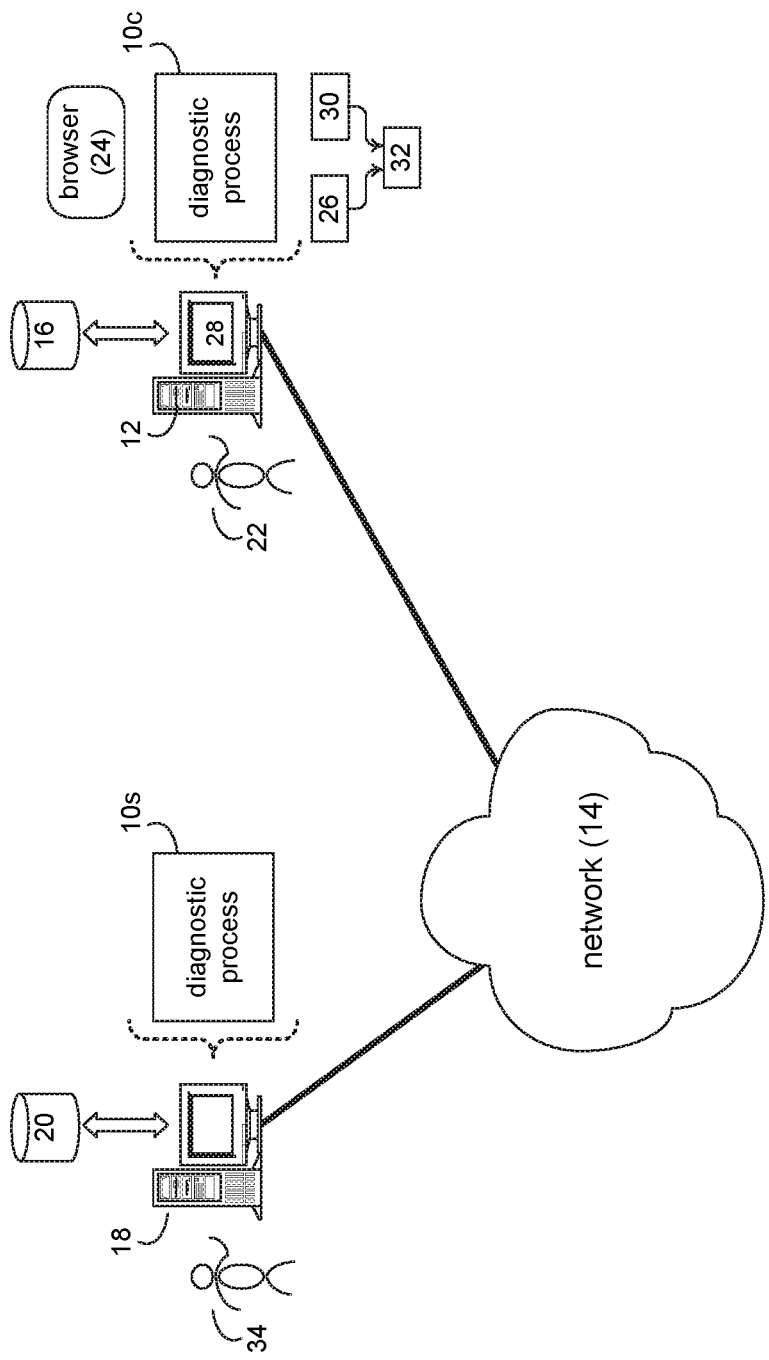
FIG. 1 is a diagrammatic view of a distributed computing network including a computing device that executes a diagnostic process according to an embodiment of the present disclosure.

Referring to FIG. 1, there is shown diagnostic process 10. Diagnostic process 10 may be implemented as a server-side process, a client-side process, or a hybrid server-side/client-side process. For example, diagnostic process 10 may be implemented as a purely client-side process via reward process 10*c*. Alternatively, diagnostic process 10 may be implemented as a hybrid server-side/client-side process via reward process 10*c* in combination with diagnostic process 10*s*. Accordingly, diagnostic process 10 as used in this disclosure may include any combination of diagnostic process 10*s* and diagnostic 10*c*.

Diagnostic process 10*c* may be a client application and may reside on and may be executed by computing device 12, which may be coupled to network 14 (e.g., the Internet or a local area network). Examples of computing device 12 may include, but are not limited to: a smartphone, a tablet computer, a notebook computer, a laptop computer, a personal computer, and a server computer. Computing device 12 may execute an operating system, examples of which may include but are not limited to Microsoft Windows™, Mac OS™, Android™, iOS™, Linux™, or a custom operating system.

The instruction sets and subroutines of diagnostic process 10*c*, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Diagnostic process 10s may be a server application and may reside on and may be executed by computing device 18, which may also be coupled to network 14 (e.g., the Internet or a local area network), thus allowing diagnostic process 10c and diagnostic process 10s to communicate. Examples of computing device 18 may include, but are not limited to: a personal computer, a server computer, a series of server computers, a mini computer, a mainframe computer, or a cloud-based computing platform/service/network. Computing device 18 may execute an operating system, examples of which may include but are not limited to Microsoft Windows™, Mac OS™, Android™, iOS™, Linux™, or a custom operating system.

The instruction sets and subroutines of diagnostic process 10s, which may be stored on storage device 20 coupled to computing device 18, may be executed by one or more processors (not shown) and one or more memory architectures (not shown) included within computing device 18. Examples of storage device 20 may include but are not limited to: a hard disk drive; a RAID device; a random access memory (RAM); a read-only memory (ROM); and all forms of flash memory storage devices.

Diagnostic Process

Assume for illustrative purposes that computing device 12 is a personal computer that is used by user 22 to execute various computer applications including, but not limited to, web browser 24. For this example, user 22 may be any type of computer user. Accordingly, user 22 may be an ordinary computer user who uses computing device 12 for their personal enjoyment or for work-related tasks. Alternatively, user 22 may be an IT professional who uses computing device 12 to test various programs and/or computing platforms.

Assume, for this example, that while user 22 is using web browser 24, a computer malfunction event occurs. Examples of such a computer malfunction event may include but are not limited to web browser 24 freezing, web browser 24 failing to load a webpage, or web browser 24 simply operating in an improper fashion. Accordingly, user 22 may utilize diagnostic process 10 to analyze this computer malfunction event.

Therefore, upon realizing that a computer malfunction event has occurred, user 22 may initiate diagnostic process 10 and repeat the procedures that led up to the computer malfunction event so that it could be analyzed by diagnostic process 10. For example, web browser 24 (or an application program interface of web browser 24) may be utilized to allow user 22 to conveniently initiate diagnostic process 10. For example, a default toolbar (not shown) incorporated into web browser 24 may be modified to include a "start" button (not shown) that allows user 22 to initiate diagnostic process 10.

Figure 2:
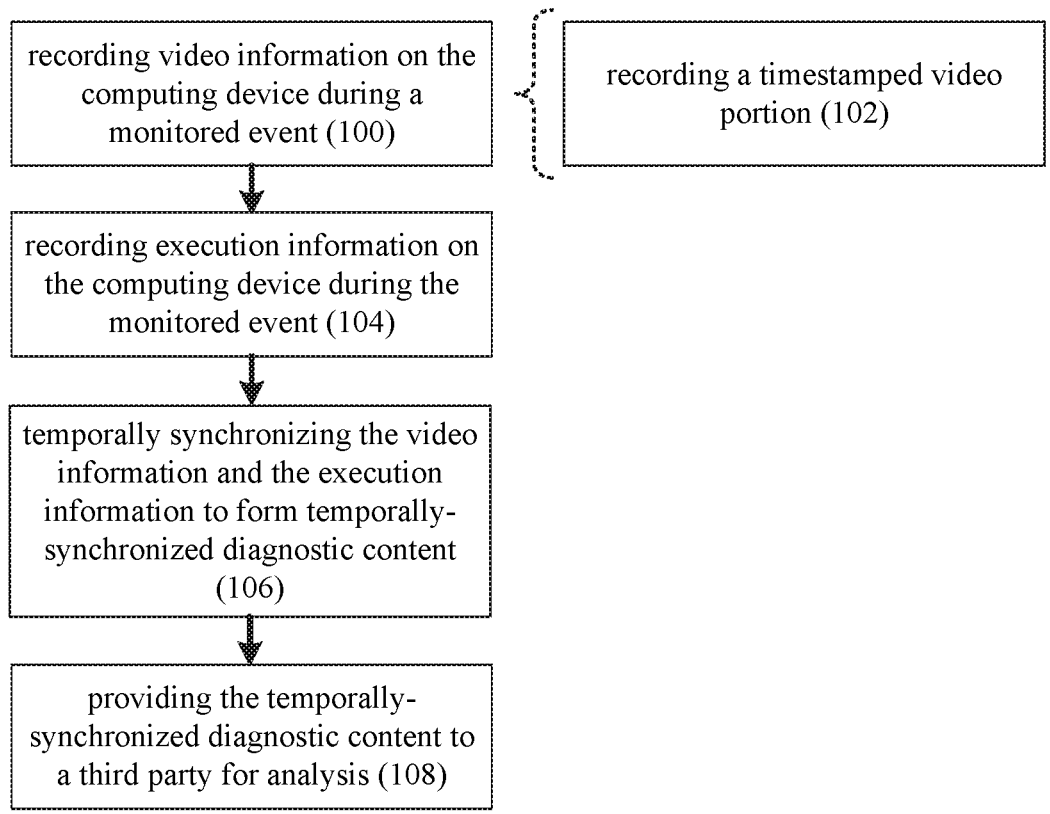
FIG. 2 is a flowchart of the diagnostic process of FIG. 1 according to an embodiment of the present disclosure.

Referring also to FIG. 2, diagnostic process 10 may record 100 video information (e.g. video information 26) on computing device 12 during a monitored event (e.g. the above-described computer malfunction event). While the following discussion concerns the event being monitored by diagnostic process 10 as a computer malfunction event, this is for illustrative purposes only and is not intended to be a limitation of this disclosure, as other configurations are possible. For example, user 22 may utilize diagnostic process 10 to simply monitor the operation of web browser 24, regardless of whether web browser 24 is operating properly or is operating improperly.

Video information 26 may include web browser content that is rendered within web browser 26 by computing device 12. For example, video information 26 may be the content that was rendered within web browser 26 during the recording 100 process described above. Therefore, video information 26 may include static images (e.g. words, pictures, tables, images) or moving images (e.g. videos, animations).

When diagnostic process 10 effectuates the recording 100 of video information 26 rendered (in this example) within web browser 24, this may be accomplished using one or more functionalities included within (or incorporated into) web browser 24. For example, Google Chrome™ and Microsoft Edge™ may include native functionality that may allow for the recording of content rendered within these web browsers. Accordingly, diagnostic process 10 may be configured to utilize such native functionalities within these web browsers to effectuate the recording 100 of video information 26.

While the following discussion concerns video information 26 being content that is rendered by a specific application (e.g. web browser 26), this is for illustrative purposes only and is not intended to be a limitation of this disclosure, as other configurations are possible. For example, the recording 100 of video information 26 may be broader in scope and may include the recording 100 of all content shown on display 28 of computing device 12.

When recording 100 video information 26 on computing device 12 during a monitored event (e.g. the above-described computer malfunction event), diagnostic process 10 may record 102 a timestamped video portion. For example, diagnostic process 10 may record the content of web browser 24 one portion (or chunk) at a time. The granularity of these portions may be adjusted based upon system needs, capabilities, or the desired level of granularity. For example, assume that video information 26 is recorded 100 in one second portions by diagnostic process 10. When recording these one second portions of video, diagnostic process 10 may apply a time stamp to each of these one second video portions so that the time at which a specific video portion was recorded is known. The time included in these timestamps may be obtained from e.g. web browser 26 and/or a system clock (not shown) included within computing device 12. For example, diagnostic process 10 may utilize a MediaRecorder API (e.g., of web browser 24), to save the exact timestamp and file size of a particular video portion.

In addition to recording 100 video information 26, diagnostic process 10 may record 104 execution information 30 on computing device 12 during the monitored event (e.g. the above-described computer malfunction event). For example, diagnostic process 10 may record 104 various pieces of execution information 30 that are available from computing device 12 and/or web browser 24 so that execution information 30 may be used (in conjunction with video information 26) to aid in the understanding/diagnosis/repair of the above-described computer malfunction event. Examples of execution information 30 may include, but are not limited to, network traffic information and diagnostic information.

As discussed above, web browser 24 may be configured to provide one or more native functionalities. For example, Google Chrome™ and Microsoft Edge™ may include native functionalities that gather execution information (e.g. execution information 30). Additionally/alternatively, computing device 12 (or the operating system/applications executed on computing device 12) may be configured to gather execution information 30. Accordingly, diagnostic process 10 may be configured to utilize such native functionalities within e.g. web browser 24, computing device 12, the operating system of computing device 12, or one or more applications executed on computing device 12 to obtain execution information 30.

For example and when recording 104 execution information 30, diagnostic process 10 may enable the console domain (e.g., of web browser 24) to collect console messages that were already in the buffer, as well as collect new console message as they arrive. Further, diagnostic process 10 may enable the debugger domain (e.g., of web browser 24) to collect scriptParsed and scriptFailedToParse events, wherein these scriptParsed events may allow diagnostic process 10 to determine whether scripts have associated source maps and (if so) store these associated source maps for stack traces. Further, diagnostic process 10 may enable the network domain (e.g., of web browser 24) to collect all network events as they occur, which may be logged. When the loadingFinished event is received, if the request type is 'XHR' (which typically indicates a dynamic resource being loaded), diagnostic process 10 may retrieve the response body from web browser 24 (which may also be logged).

In a fashion similar to that of video information 26, execution information 30 may be timestamped (in the event that execution information 30 does not include native time indicators).

Diagnostic process 10 may temporally synchronize 106 (using the above-described timestamps) video information 26 and execution information 30 to form temporally-synchronized diagnostic content 32. The process of temporal synchronizing 106 video information 26 and execution information 30 to form temporally-synchronized diagnostic content 32 may be done locally (e.g. on computing device 12) or remotely (e.g. on computing device 18). As discussed above, examples of computing device 18 may include, but are not limited to: a personal computer, a server computer, a series of server computers, a mini computer, a mainframe computer, or a cloud-based computing platform/network. Accordingly, diagnostic process 10 may upload video information 26 and execution information 30 to a cloud-based platform (e.g. the Google cloud) where video information 26 and execution information 30 may be temporally synchronized 106 to form temporally-synchronized diagnostic content 32. In the event that video information 26 and/or execution information 30 is provided to a third party (e.g. the Google cloud), one or more of video information 26 and/or execution information 30 may be encrypted.

Temporally-synchronized diagnostic content 32 may be played (e.g., in a web browser or media player) by e.g. user 22, which may allow user 22 to ascertain the cause of the above-described computer malfunction. For example, temporally-synchronized diagnostic content 32 (when played) may allow user 22 to monitor the status of the above-described execution information 30 while watching video information 26. Accordingly, when the above-described computer malfunction occurs (as evidenced by video information 26), user 22 may be able to determine what was going on within web browser 24 via execution information 30. Temporally-synchronized diagnostic content 32 may be configured to allow user 22 to pause the play back of temporally-synchronized diagnostic content 32 so that certain areas of temporally-synchronized diagnostic content 32 may be scrutinized (e.g. the area in which the above-described computer malfunction event begins to occur).

While temporarily-synchronized diagnostic content 32 is described above as being reviewed locally (e.g. on computing device 12 by user 22), other configurations are possible are considered to be within the scope of this disclosure. For example, diagnostic process 10 may be configured to provide 108 temporally-synchronized diagnostic content 32 to a third party for analysis. Examples of such a third party may include but are not limited to user 34. For example, user 34 may be a remote diagnostic technician that is either works with user 22 or works for a company that produced e.g. computing device 12 or by browser 24. Accordingly, in the event of the above-described computer malfunction, user 22 may utilize diagnostic process 10 to capture video information 26 and execution information 30, which may be temporally synchronized 106 to form temporally-synchronized diagnostic content 32 that may be provided to users 34 (who works for a technical support line for e.g. web browser 24). Therefore and when diagnosing the above-described computer malfunction event, user 34 may simply review temporally-synchronized diagnostic content 32 determine a cause of the above-described computer malfunction event (as opposed to requiring that user 22 describe or replicate the above-described computer malfunction event for user 34).

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    recording video information on the computing device during a monitored event, wherein the monitored event includes one or more user interactions with a web browser and wherein the video information includes a screen recording of the one or more user interactions with the web browser content rendered within the web browser by the computing device;
    recording execution information associated with the web browser on the computing device during the monitored event; and
    temporally synchronizing the video information and the execution information to form temporally-synchronized diagnostic content that is configured to allow a user to monitor a status of the recorded execution information while playing back synchronized recorded video information.

2. The computer-implemented method of claim 1 further comprising:
    providing the temporally-synchronized diagnostic content to a third party for analysis.

3. The computer-implemented method of claim 1 wherein recording video information on the computing device during a monitored event includes:
    recording a timestamped video portion.

4. The computer-implemented method of claim 1 wherein the execution information includes network traffic information.

5. The computer-implemented method of claim 1 wherein the execution information includes diagnostic information.

6. The computer-implemented method of claim 1 wherein the monitored event is a computer malfunction event.

7. A computer program product residing on a non-transitory computer readable medium having a plurality of instructions stored thereon which, when executed by a processor, cause the processor to perform operations comprising:
    recording video information on the computing device during a monitored event, wherein the monitored event includes one or more user interactions with a web browser and wherein the video information includes a screen recording of the one or more user interactions with the web browser content rendered within the web browser by the computing device;
    recording execution information associated with the web browser on the computing device during the monitored event; and
    temporally synchronizing the video information and the execution information to form temporally-synchronized diagnostic content that is configured to allow a user to monitor a status of the recorded execution information while playing back synchronized recorded video information.

8. The computer program product of claim 7 further comprising:
    providing the temporally-synchronized diagnostic content to a third party for analysis.

9. The computer program product of claim 7 wherein recording video information on the computing device during a monitored event includes:
    recording a timestamped video portion.

10. The computer program product of claim 7 wherein the execution information includes network traffic information.

11. The computer program product of claim 7 wherein the execution information includes diagnostic information.

12. The computer program product of claim 7 wherein the monitored event is a computer malfunction event.

13. A computing system including a processor and memory configured to perform operations comprising:
    recording video information on the computing device during a monitored event, wherein the monitored event includes one or more user interactions with a web browser and wherein the video information includes a screen recording of the one or more user interactions with the web browser content rendered within the web browser by the computing device;
    recording execution information associated with the web browser on the computing device during the monitored event; and
    temporally synchronizing the video information and the execution information to form temporally-synchronized diagnostic content that is configured to allow a user to monitor a status of the recorded execution information while playing back synchronized recorded video information.

14. The computing system of claim 13 further configured to perform operations comprising:
    providing the temporally-synchronized diagnostic content to a third party for analysis.

15. The computing system of claim 13 wherein recording video information on the computing device during a monitored event includes:
    recording a timestamped video portion.

16. The computing system of claim 13 wherein the execution information includes network traffic information.

17. The computing system of claim 13 wherein the execution information includes diagnostic information.

18. The computing system of claim 13 wherein the monitored event is a computer malfunction event.

\* \* \* \* \*